United States Patent
Choi et al.

(10) Patent No.: US 7,339,359 B2
(45) Date of Patent: Mar. 4, 2008

(54) TERMINAL FOR MULTIPLE FUNCTIONS IN A POWER SUPPLY

(75) Inventors: Jinho Choi, Plano, TX (US); Eung-Suen Kim, Incheon (KR)

(73) Assignee: Fairchild Semiconductor Corporation, South Portland, ME (US)

( * ) Notice: Subject to any disclaimer, the term of this patent is extended or adjusted under 35 U.S.C. 154(b) by 18 days.

(21) Appl. No.: 11/083,474

(22) Filed: Mar. 18, 2005

(65) Prior Publication Data

US 2006/0209581 A1    Sep. 21, 2006

(51) Int. Cl.
*G05F 1/575*    (2006.01)
*G05F 1/569*    (2006.01)

(52) U.S. Cl. ..................... 323/284; 323/285

(58) Field of Classification Search ............ 363/15–17, 363/20, 21.01, 21.04, 21.07, 21.09, 21.11, 363/21.12, 21.15, 21.17, 21.18, 97, 131; 323/282, 284, 285
See application file for complete search history.

(56) References Cited

U.S. PATENT DOCUMENTS

| | | | |
|---|---|---|---|
| 5,914,865 A | * | 6/1999 | Barbehenn et al. ...... 363/21.15 |
| 6,304,462 B1 | | 10/2001 | Balakrishnan et al. |
| 6,313,976 B1 | | 11/2001 | Balakrishnan et al. |
| 6,366,481 B1 | * | 4/2002 | Balakrishnan et al. ... 363/21.15 |
| 6,538,908 B2 | | 3/2003 | Balakrishnan |
| 6,980,443 B2 | * | 12/2005 | Nagano et al. .......... 363/21.12 |

OTHER PUBLICATIONS

Robert A. Mammano, "Applying the UCC3570 Voltage-Mode PWM Controller to Both Off-Line and DC/DC Converter Designs," Unitrode Corporation, 1994, pp. 1-13.
Datasheet L1070/LT1071, Linear Technology, "5A and 2.5A High Efficiency Switching Regulators," pp. 1-12.
Carl Nelson, Linear Technology, LT1070 Design Manual, Jun. 1986, pp. 1-80.
PCT International Search Report for International Application No. PCT/US06/09540 and Written Opinion, 8 pages.

* cited by examiner

*Primary Examiner*—Gary L Laxton
(74) *Attorney, Agent, or Firm*—Sidley Austin LLP (57) ABSTRACT

An integrated circuit (IC) device includes a first function circuitry operable to perform a first function and a second function circuitry operable to perform a second function. A multi-function terminal is provided. A voltage sensing circuit is coupled to the multi-function terminal for sensing a voltage at the multi-function terminal. If the sensed voltage is above a predetermined level, the first function circuitry is activated to perform the first function. If the sensed voltage is below the predetermined level, the second function circuit is activated to perform the second function.

5 Claims, 13 Drawing Sheets

| FIG. 5A | FIG. 5B |
| FIG. 5C | FIG. 5D |

TERMINAL FOR MULTIPLE FUNCTIONS IN A POWER SUPPLY

TECHNICAL FIELD OF THE INVENTION

This invention relates to power supplies, and more particularly, to a terminal for multiple functions in a power supply.

BACKGROUND

Power supplies are widely used in electronic devices. Generally speaking, a number of different features or functions may be desirable for power supplies. These functions include, for example, power compensation, current adjustment, Line over-voltage protection, Line under-voltage protection, external on/off, etc. Not every function, however, it necessary for a given power supply as used in a particular application (e.g., electronic device). Thus, for instance, it may be desirable in one application for a power supply to have a power limit (or compensation) function, but not a Line over-voltage protection function. In another application, it may be desirable for a power supply to have a Line over-voltage protection function, but not a current adjustment function.

A designer or manufacturer of many electronic devices may be required to provide a different type of power supply for each device depending on the features or functions which are desirable for that device. From the viewpoint of the designer or manufacturer, it is more convenient to be able to use the same basic components for implementing the different power supplies which are necessary for the various electronic devices.

For example, a power supply can be implemented using a power switch and a controller. In such case, the controller may support one or more of the functions which are desired for the power supply. A power supply designer may desire to configure the power supply controller of a switched mode power supply in particular application and/or operating conditions. For instance, there may be one application in which the power supply designer would like the power supply controller to have one particular functionality and there may be another application in which the power supply designer would like the power supply controller to have another particular functionality. It would be convenient for power supply designer to be able to use the same integrated power supply controller for these different functions.

SUMMARY

In one embodiment, a power supply is provided having a multi-function pin. Circuitry connected to the multi-function pin can be configured in various ways so that the power supply provides different functions—e.g., external current adjuster, power limit (compensation) function, line over-voltage protection, line under-voltage protection, etc. The power supply can be a switch mode power supply (SUMPS) device.

According to an embodiment of the present invention, a power supply system includes a transformer having a primary winding and a secondary winding. The primary winding is coupled to receive an input voltage, and the secondary winding for providing an output voltage. A power block is coupled to the primary winding of the transformer for controlling the current flowing through the primary winding. The power block is capable of operating in a first mode and a second mode, wherein the first mode is associated with a first function and the second mode is associated with a second function. The power block comprises a multi-function terminal and a mode detecting circuit coupled to the multi-function terminal for sensing a voltage at the multi-function terminal. If the sensed voltage is above a predetermined level, the power block operates in the first mode to perform the associated first function. If the sensed voltage is below the predetermined level, the power block operates in the second mode to perform the associated second function.

According to another embodiment of the present invention, a method is performed in an integrated circuit (IC) device having first function circuitry operable to perform a first function and second function circuitry operable to perform a second function. The method includes: sensing a voltage at a multi-function terminal; if the sensed voltage is above a predetermined level, activating the first function circuitry to perform the first function; and if the sensed voltage is below the predetermined level, activating the second function circuit to perform the second function.

According to yet another embodiment of the present invention, an integrated circuit (IC) device includes a first function circuitry operable to perform a first function and a second function circuitry operable to perform a second function. A multi-function terminal is provided. A voltage sensing circuit is coupled to the multi-function terminal for sensing a voltage at the multi-function terminal. If the sensed voltage is above a predetermined level, the first function circuitry is activated to perform the first function. If the sensed voltage is below the predetermined level, the second function circuit is activated to perform the second function.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION

The embodiments of the present invention and their advantages are best understood by referring to FIGS. 1 through 11 of the drawings. Like numerals are used for like and corresponding parts of the various drawings.

Figure 1:
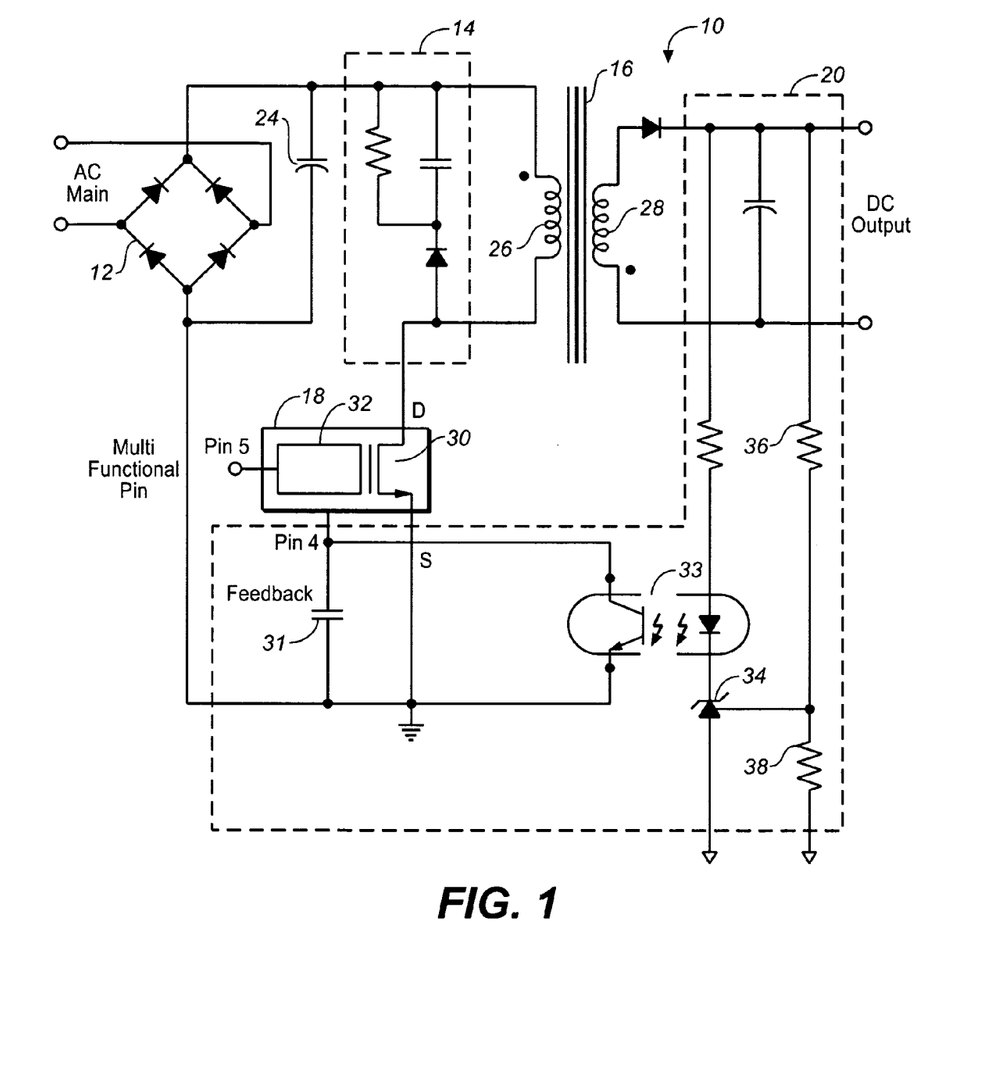
FIG. 1 is a block diagram of an exemplary implementation for a power supply system, according to an embodiment of the present invention.

FIG. 1 is a block diagram of an exemplary implementation for a power supply system 10, according to an embodiment of the present invention. As depicted, power supply system 10 includes a rectifier 12, a snubber circuit 14, a transformer 16, a power block 18, and a feedback circuit 20. Power supply system 10 receives an alternating current (AC) voltage Vac at its AC main input terminal and provides a direct current (DC) output voltage Vout to a load at its output terminal.

Rectifier 12 functions to rectify the AC input voltage to produce a DC voltage. Rectifier 16 can be implemented with a plurality of diodes arranged in a full-wave rectifier configuration, as understood by one of ordinary skill in the art. A DC link capacitor 24 is coupled to rectifier 16 to convert the rectified AC into a steady DC line voltage. Snubber circuit 14 functions to limit the drain voltage of a switch 30 (in power block 18) when the switch 30 turns on, thus protecting an integrated circuit (IC) device in which power block 18 may be implemented. Transformer 16 has a primary winding 26 and a secondary winding 28. The DC line voltage is provided at the primary winding 26 of transformer 16.

Power block 18 can be a switch mode power supply (SUMPS) device having the switch 30 and a control module 32. Switch 30 may be implemented with a power metal-oxide-semiconductor field-effect transistor (MOSFET), having a gate, a source, and a drain. In one embodiment, switch 30 may comprise a SenseFET having a built-in current sensing resistor. Control module 32 controls the driving of switch 30. In some embodiments, all or a part of power block 18 may be implemented on one or more integrated circuit (IC) devices. Power block 18 has a feedback pin Vfb (Pin4) at which it may receive a feedback signal. Power block 18 can implement or use current mode control or voltage mode control.

Power block 18 controls the operation of power supply system 10, and in particular, the provision of power to a load connected at the DC output terminal. Power supply system 10 can function or be arranged in a flyback converter or a forward converter topology. In a flyback converter topology, all energy is stored into the transformer 16 when switch 30 is turned on, and the energy is only transferred or released to the load when switch 30 is turned off. In a forward converter topology, there is no storage of energy into the transformer 16 (except a magnetic exciting energy) and a driving energy is immediately transferred to the load when switch 30 is turned on. Whether power supply system 10 functions as a flyback converter or a forward converter depends on the direction of the windings 26 and 28 of the transformer 16. Power block 18 can implement a pulse width modulation (PWM) controller.

The feedback circuit 20 provides a feedback signal to power block 18 at its feedback pin Vfb. Feedback circuit 20, in one embodiment, includes a feedback capacitor 31, an opto-coupler 33 and a shunt regulator 34. The shunt regulator 34 can be implemented, for example, using a model TL431 available from Fairchild Semiconductor Corporation. The shunt regulator 34 compares its internal reference voltage to a voltage which is sensed using two resistors 36 and 38 determines how long to turn on the opto-coupler 33. In one embodiment, as depicted, feedback circuit 20 supports current mode control. The turn-on time for the opto-coupler 33 determines the amount of control current flowing. The longer that the opto-coupler 33 is turned on, the lower the voltage of the feedback capacitor 33.

Various functions may be desirable for power supply system 10. These functions include, for example, on/off control, current limiting, power compensation, line over-voltage protection, line under-voltage protection, maximum duty cycle adjustment, etc. In order to provide these functions, power block 18 includes a multi-function (MF) terminal and circuitry for sensing the voltage level of the MF terminal. Depending on the voltage level (e.g., negative voltage or ground (GND), or positive voltage) at the MF terminal, power block 18 may provide one function (or group of functions) or another. For example, in one embodiment, if the voltage at MF terminal is at or above some predetermined level (e.g., 0.3V) at the moment of start-up, power block 18 will support one function or group of functions, such as, for example, current limiting. Alternately, if the voltage at MF terminal is at or below some predetermined level at the moment of start-up, power block 18 will support another function or group of functions, such as, for example, power limiting, line over-voltage protection (Line OVP), and line under-voltage protection (Line UVLO). The voltage level at the multi-function terminal may be set or adjusted by configuring the external circuitry which is connected to the MF terminal.

Figure 2:
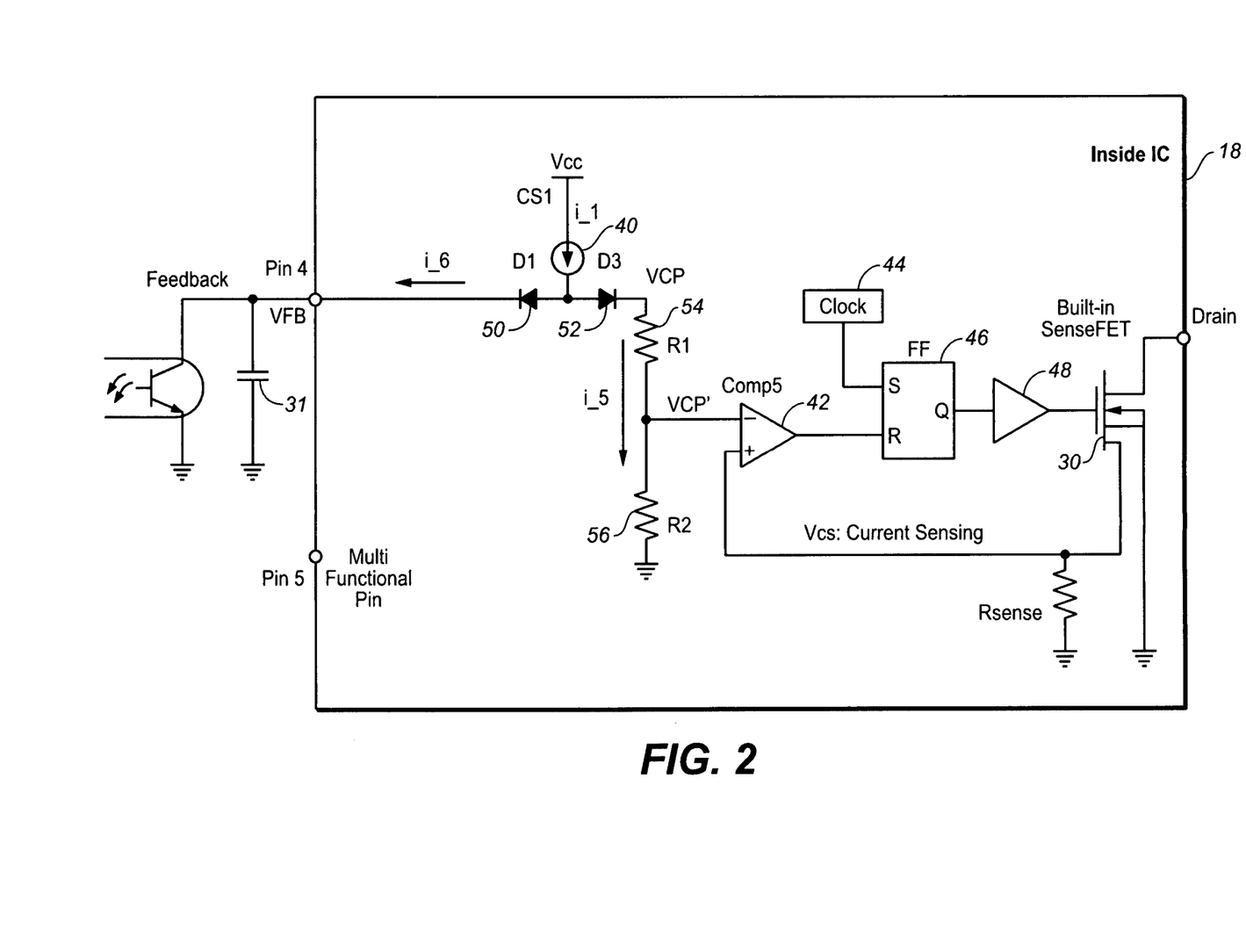
FIG. 2 is a schematic diagram in partial block form of a portion of a power block, according to an embodiment of present invention.

FIG. 2 is a schematic diagram in partial block form of a portion of a power block 18, according to an embodiment of present invention. Power block 18, which may be incorporated into a power supply system, controls the provision of power to a load by the power supply system 10. Power block 18 can be implemented on one or more integrated circuit (IC) devices. As shown, this portion of power block 18 includes an internal current source (CS1) 40, a comparator 42, a clock 44, a flip-flop (FF) 46, a driver 48, and the switch 30.

As depicted, power block 18 implements current mode control. In current mode control, a voltage Vcs related to the current sensed by the current-sensing resistor (Rsense) of switch 30 is compared against a signal derived from the feedback voltage Vfb at the feedback terminal. Internal current source 40 provides a current i_1. In one embodiment, current i_1 may have a value of 900 µA. A control voltage Vcp is provided at a node within the power block 18. A pair of diodes 50 and 52 physically separate or disconnect the control voltage Vcp from the voltage Vfb at the feedback terminal (i.e., the voltage of the feedback capacitor 31). Internally, the control voltage Vcp follows the voltage Vfb of the feedback terminal by operation of the internal current source CS1 40 (Vfb=Vcp).

Resistors 54 and 56 implement a voltage divider which divides the control voltage Vcp to provide a voltage Vcp'. Voltage Vcp' is used for comparison. In one embodiment, resistors 54 and 56 may have values of 2.0 KΩ and 0.8 KΩ, respectively. Comparator 42 compares the voltage Vcp' to a switch current sensing voltage Vcs. This determines the turn-on time of the flip-flop 46. The turn-on time of flip-flop 46 is related to the DC output of power supply system 10. If the DC voltage output is too high, the turn-on time of the flip-flop 46 is made shorter. If the DC voltage output is too low, the turn-on time of the flip-flop 46 is made longer.

In a normal operation for power block 18, the current i_1 of current source 40 flows into the ground along two paths—one path through diode 50 as current i_6, and another path through diode 52 as current i_5. When the output load condition is increased, the current i_6 flowing through diode 50 is decreased and the current i_5 flowing through diode 52 is increased. When maximum power is needed for the output load, the current i_5 flowing through diode 52 will be the same as current i_1 flowing out of current source 40. The current i_5 flowing through diode 52 (which is the same as the current through the resistors 54 and 56) makes control voltage Vcp go to the maximum value. The maximum value of control voltage Vcp occurs under the following condition: i_5=i_1, where R1 and R2 are the values for resistors 54 and 56, respectively. The value of Vcp(max) will be i_5*(R1+R2).

Figure 3:
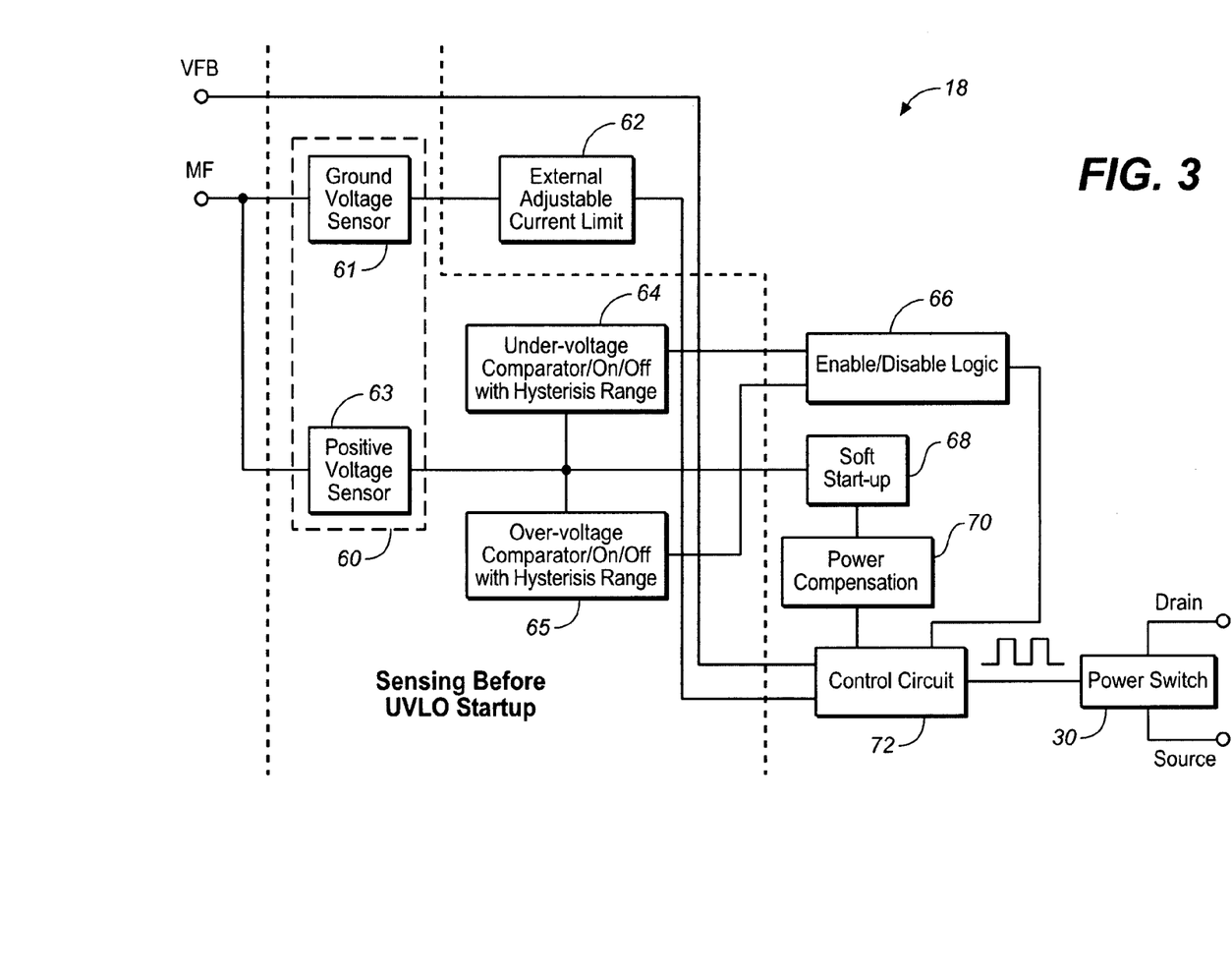
FIG. 3 is a block diagram of a portion of a power block having a terminal for supporting multiple functions, according to an embodiment of present invention.

FIG. 3 is a block diagram of a portion of a power block 18 having a multi-function (MF) terminal for supporting multiple functions, according to an embodiment of present invention. Power block 18 can be used in a variety of applications for a power supply system. As shown, power block 18 includes a mode detecting circuit 60, first function circuitry (comprising, for example, an external adjustable current limiting circuit 62), second function circuitry (comprising, for example, under-voltage comparator on/off circuit 64, over-voltage protection on/off circuit 65, enable/disable logic 66, soft start-up circuit 68, and power compensation (or power limit) circuit 70), control circuit 72, and switch 30.

The circuitry associated with the multi-function (MF) terminal in power block 18 supports or provides a number of functions—for example, on/off control, current limiting, power limiting, line over-voltage protection, line under-voltage protection, maximum duty cycle adjustment, etc.—which may be desirable for the various applications. Because not all functions are necessary or desirable for each application, power block 18 may operate in a plurality of different modes, where in each mode power block 18 provides or supports a different function or group of functions. In one embodiment, the mode in which power block 18 is operating can be a function of the voltage level at the multi-function (MF) terminal. Different voltage levels at the MF terminal can be established by connecting various external elements at the MF terminal.

In one embodiment, there are two modes for power block 18 depending on the voltage level at the multi-function (MF) terminal. Each mode is associated with a different function or group of functions. Referring to FIG. 3, mode detecting circuit 60 senses the voltage at the MF terminal to determine the mode of operation for power block 18. Mode detecting circuit 60 may comprise a first voltage sensor circuit 61 and a second voltage sensor circuit 63. The first voltage sensor circuit 61 senses whether the voltage at MF terminal is at or below a particular voltage level (e.g., 0.3V). In one embodiment, if the voltage at MF terminal is at or below the particular level at the moment of start-up, power block 18 will operate in a first mode, thereby supporting one function or group of functions. The second voltage sensor circuit 63 senses whether the voltage at MF terminal is at or above the particular voltage level. In one embodiment, if the voltage at MF terminal is at or above the particular level at the moment of start-up, power block 18 will operate in a second mode, thereby supporting another function or group of functions.

Mode detecting circuit 60 may provide one or more output signals for indicating the mode of operation for power block 18 in a particular application, thus selecting or determining the function (or group of functions) to be supported by power block 18 in that application.

Figure 4A:
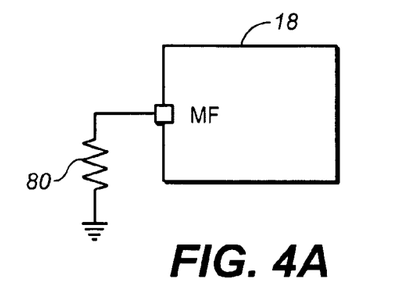
FIGS. 4A through 4E are schematic diagrams in partial block form of a power supply having circuitry connected to a multi-function terminal configured to provide different functions, according to an embodiment of present invention.

First function circuitry (comprising, for example, an external adjustable current limiting circuit 62) receives or is selected by an output signal from mode detecting circuit 60. First function circuitry provides or supports one function or group of functions which, as shown, can be current limiting. That is, power block 18 limits the amount of current that flows through the switch mode power supply (SUMPS). In one embodiment, first function circuitry can be activated or selected by connecting the MF terminal of power block 18 to ground (GND) through an external resistor, as shown in FIG. 4A. With this configuration, power block 18 limits the current to a desired value. In particular, the current limit of the power block 18 may be adjusted by externally setting the value of the external resistor connected between the MF terminal and ground.

Figure 4B:
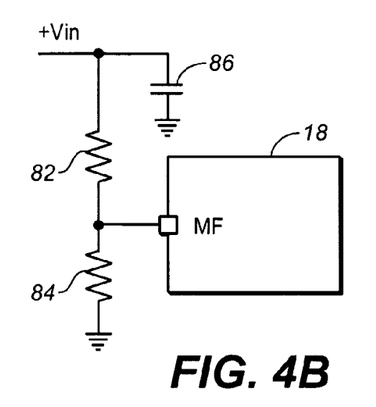

Similarly, second function circuitry (comprising, for example, under-voltage comparator on/off circuit 64, over-voltage protection on/off circuit 65, enable/disable logic 66, soft start-up circuit 68, and power compensation circuit 70) also receives or is selected by an output signal from mode detecting circuit 60. Second function circuitry provides or supports another function or group of functions which, as shown, can be power limiting, line over-voltage protection (Line OVP), and line under-voltage protection (Line UVLO). In one embodiment, second function circuitry can activated or selected by connecting the MF terminal to the input supply voltage through a voltage divider circuit as shown in FIG. 4B. With this configuration, power block 18 may detect and protection against an under-voltage condition, an over-voltage condition, and/or adjust the maximum duty cycle of power supply system.

In second function circuitry, the under-voltage comparator on/off circuit 64 detects a line under-voltage condition, and the over-voltage comparator on/off circuit 65 detects a line over-voltage condition. Circuits 64 and 65 provide output signals to enable/disable logic 66 in the event of detection of one or both of the respective conditions. If any one of the under-voltage or over-voltage conditions exist, enable/disable logic 66 disables the power supply system 10 by providing an appropriate signal to control circuit 72. When the under-voltage and over-voltage conditions are removed, enable/disable logic 66 may enable power supply system 10.

It is understood that the functions of first function circuitry and second function circuitry shown in FIG. 3 are exemplary only, and not intended to be limiting. Other functions in addition to or instead of the exemplary functions may be provided or supported. First and second function circuitry may each generate one or more output signals.

Control circuit 72 generates switching waveforms to control power switch 30. Control circuit 72 operates in conjunction with first function circuitry and second function circuitry to provide or support the different functions that may be desired of power supply system 10 in various applications. Control circuit 72 is connected to, and receives and is responsive to signals from, first function circuitry and second function circuitry. These signals may include a sense signal Vcs received from drain terminal, enable/disable signal from enable/disable logic 66, maximum peak current limit adjustment signal from power compensation circuit 70, and external current limit adjustment signal from external adjustable current limiting circuit 62. Control circuit 70 is also connected to, and receives and is responsive to a feedback signal Vfb from, the feedback terminal. Control circuit 72 generates a signal for the duty cycle of the pulse width modulation (PWM) controller.

Figure 4C:
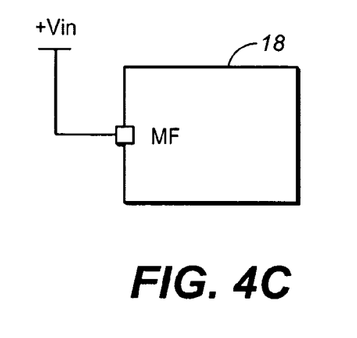
Figure 4D:
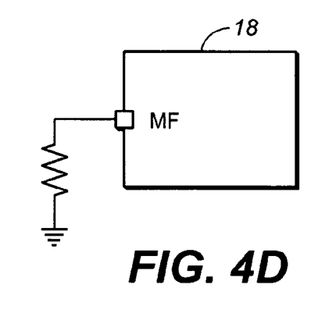
Figure 4E:
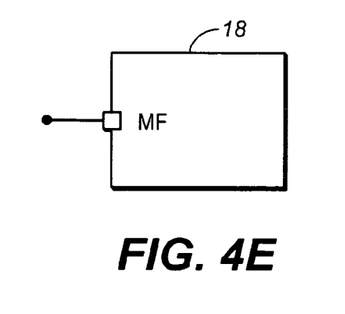

Various circuitry or connections, as shown in FIGS. 4A through 4E, for the multi-function (MF) terminal will determine or select the functions for power block 18. In one embodiment, if the multi-function terminal of power block 18 is connected to ground (GND) through an external resistor 80 as shown in FIG. 4A, power block 18 limits the current of the power switch 30 to a desired value. That is, by connecting a resistor between the multi-function terminal and ground, power block 18 senses the ground voltage on the terminal, thus invoking or activating the current-limiting function. The current limit will be set by the value of the resistor 80. If the multi-function terminal is connected to the input DC line using a voltage divider circuit (comprising resistors 82 and 84) as shown in FIG. 4B, power block 18 may provide under-voltage protection, over-voltage protection and/or adjustment of the maximum duty cycle of power switch 30. That is, by applying a resistor divider between the DC Link voltage of the SUMPS and the multi-purpose pin, the multifunction state is invoked because a positive voltage will be sensed on the MF terminal. If the multi-function terminal is short-circuited to ground (GND) as shown in FIG. 4C or to the input voltage supply as shown in FIG. 4D, the power block 18 is disabled. If there is an open-circuit at the multi-function terminal as shown in FIG. 4E, the power block 18 operates normally without any external restrictions. That is, the power block may provide power compensation or brown-out protection.

Figures 5, 5A:
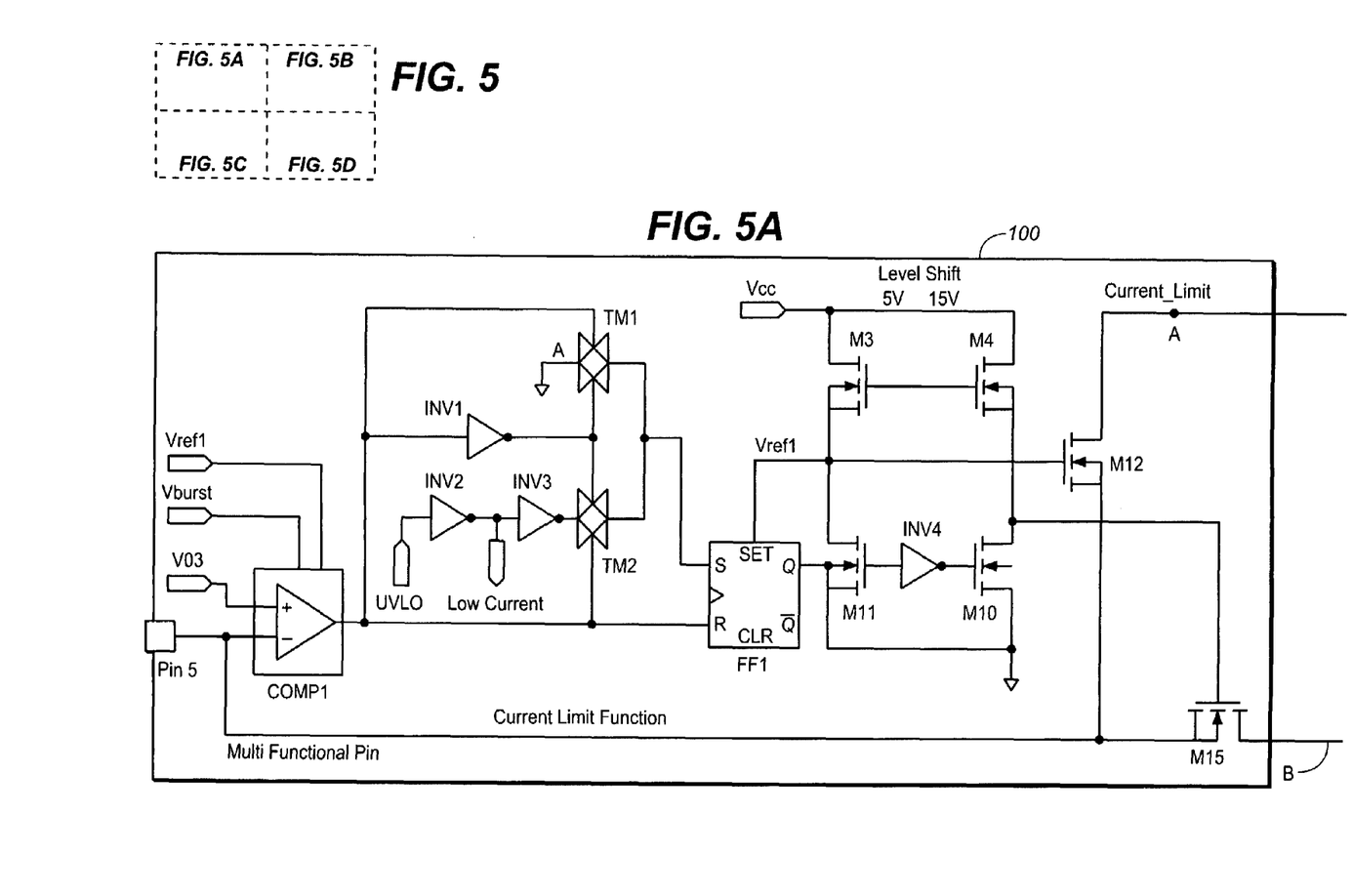
FIG. 5 is a schematic diagram of one exemplary implementation for a power block, according to an embodiment of present invention.
Figure 5B:
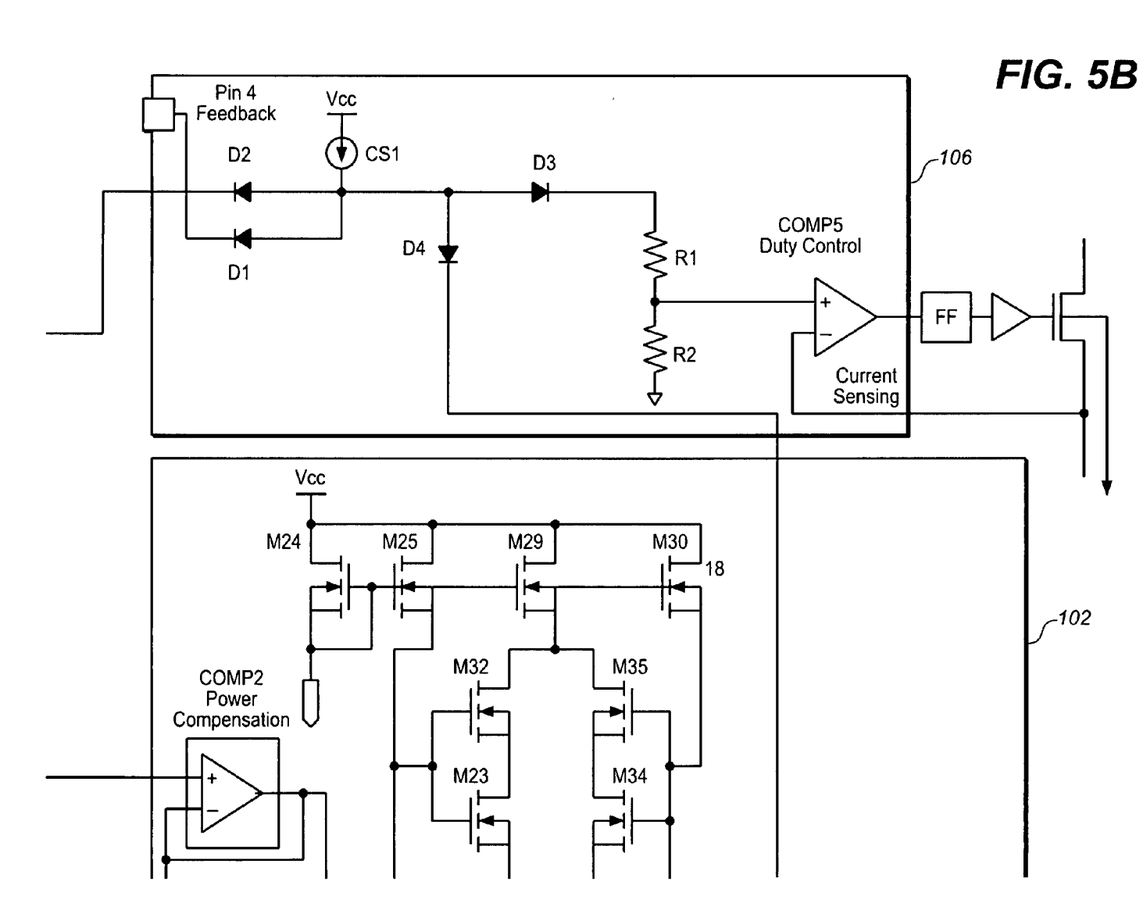
Figure 5C:
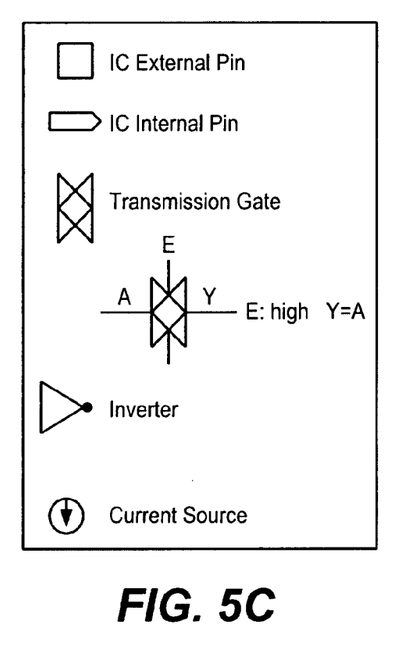
Figure 5D:
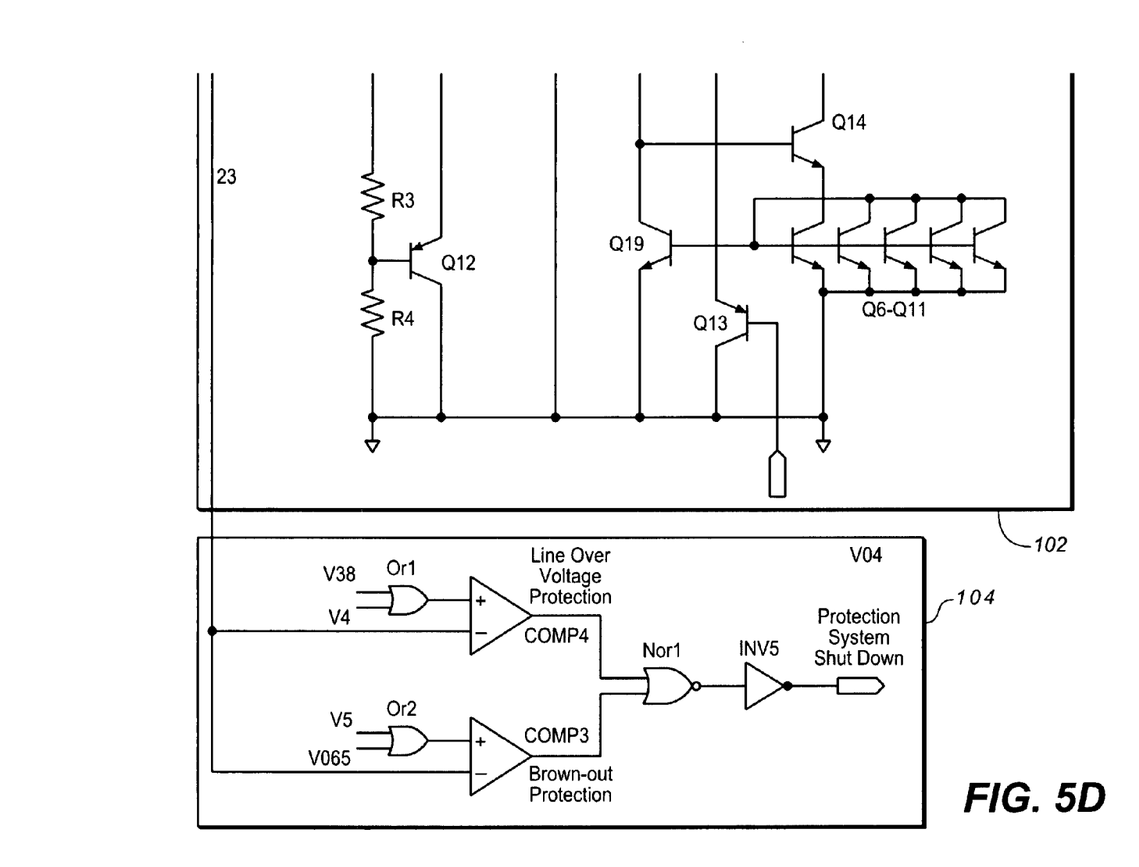

FIG. 5 is a schematic diagram of one exemplary implementation for power block 18, according to an embodiment of present invention. FIG. 5 illustrates partial details for exemplary implementations of circuitry 100 for detecting the mode for power block 18, circuitry 106 for limiting current, circuitry 102 for limiting power, and circuitry 104 for providing line over-voltage protection and brown-out protection. This circuitry is described in more detail below with reference to FIGS. 6 through 10.

Figure 6:
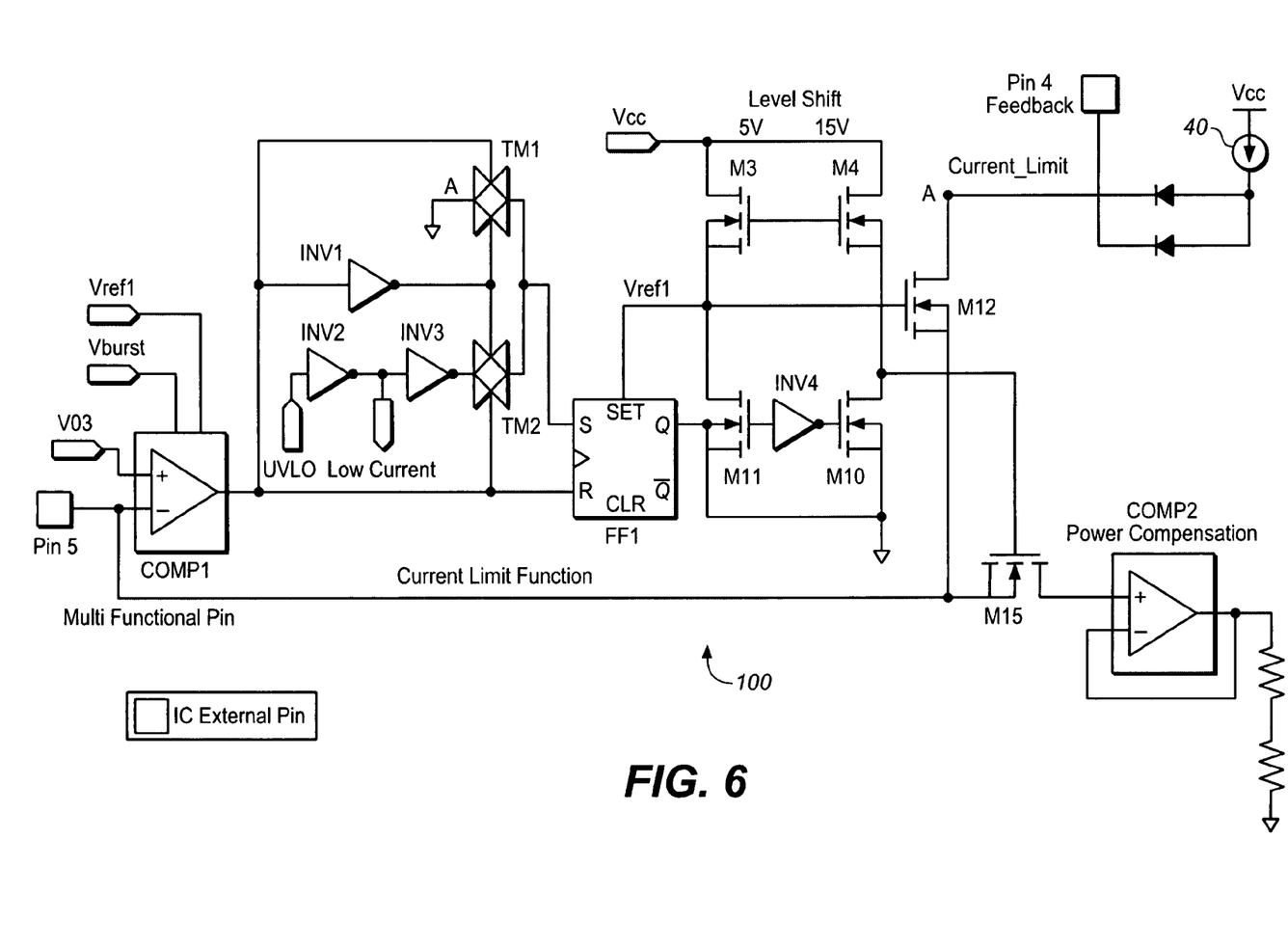
FIG. 6 is a schematic diagram of circuitry for detecting a mode and activating circuitry for the same, according to an embodiment of present invention.

FIG. 6 is a schematic diagram of circuitry 100 for detecting and activating a mode, according to an embodiment of present invention. Circuitry 100 determines a mode of operation for power block 18 by sensing the voltage level at the multi-function MF terminal (pin 5) of power block 18. There can be two modes, each associated with a respective function or group of functions. In one embodiment, in the first mode, power block 18 provides or supports a function of current limiting; and in the second mode, power block 18 provides or supports other functions, such as, power limiting, line over-voltage protection, and brown-out protection. In one embodiment, circuitry 100 can be an implementation, at least in part, for mode detecting circuit 60.

Circuitry 100 has a first node A and a second node B. First node A is connected to circuitry for performing the first function or group of functions. Second node B is connected to circuitry for performing the second function or group of functions.

Circuitry 100 operates as follows to detect and activate the mode for power block 18. A comparator COMP1 compares the voltage at the multi-function (MF) terminal to a reference voltage V03. Reference voltage V03 will be higher than the voltage at MF terminal if the first function—e.g., current limiting—is desired. If the reference voltage V03 is higher, the output of the comparator COMP1 is high. Thus, the output of inverter INV1, which receives the output of comparator COMP1, will be low. This causes transmission gate TM1 to turn on and transmission gate TM2 to turn off. A transmission gate operate such that, if the gate is enabled (or turned on, for example, with a high signal), the signal at the input terminal of the gate is transmitted (or passed) through the gate and provided at the gate's output terminal. Thus, if transmission gate TM1 is turned on, its output will be low since its input is connected to ground (GND). This low output voltage from the transmission gate TM1 (through operation of flip-flop FF1, switch M11, and inverter INV4) results in a high voltage at the gate of switch M10. This causes switch M12 to turn on and switch M12 to turn off. Under these conditions, the power block 18 is in the first mode. This means that the current limiting function is activated. The first node A, and thus the circuitry 106 for performing the current limiting function, is electrically connected to the MF terminal (pin 5). With switch M15 turned off, there is no connection between the MF terminal and the circuitry 102 and 104 for the other functions (for example, power limiting function, line over-voltage protection, and brown-out protection). Thus, the other functions are not selected or operating.

Alternatively, reference voltage V03 will be lower than the voltage at the multi-function (MF) terminal if the second function—e.g., power limiting, line over-voltage protection, or brown-out function—is desired. If the reference voltage V03 is lower than the voltage at MF terminal, then switch M15 is turned on and switch M12 is turned off. Under these conditions, the power block 18 is in the second mode. This means that the other functions are activated. The second node B, and thus the circuitry 102 and 104 for performing power limiting function, line over-voltage protection, and brown-out protection, are electrically connected to the MF terminal (pin 5). With switch M12 turned off, there is no connection between the MF terminal and the circuitry 106 for the first function (e.g., current limiting). Thus, the first function is not selected or operating.

Figure 7:
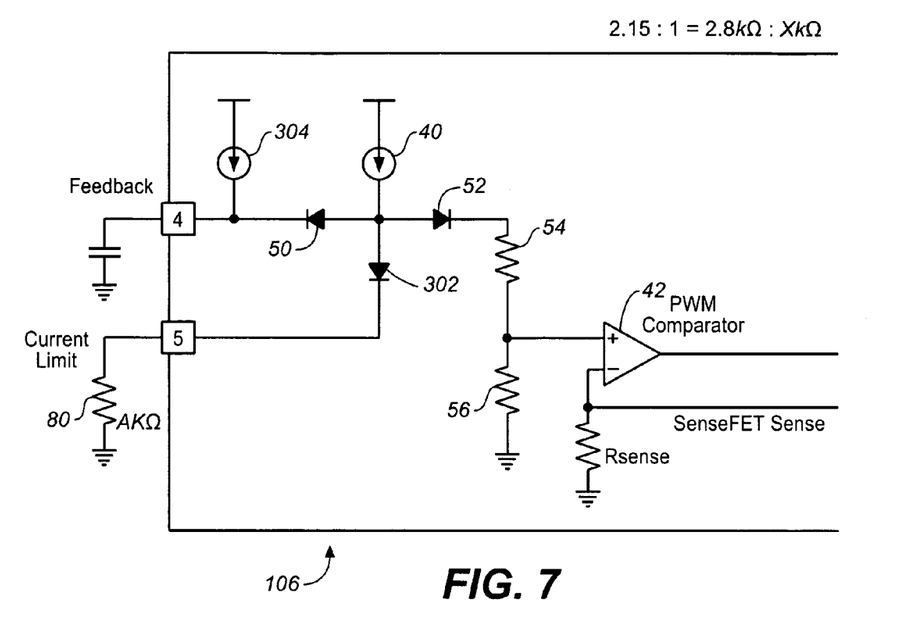
FIG. 7 is a schematic diagram of circuitry for performing a function of limiting current, according to an embodiment of present invention.

FIG. 7 is a schematic diagram of circuitry 106 for performing a function of limiting current, according to an embodiment of present invention. Such function may be desirable because it helps to prevent saturation of the transformer 16 of the power supply system 10, thus reducing the size and cost of the transformer. In one embodiment, circuitry 106 can be an implementation, at least in part, for first function circuitry.

Circuitry 106 is activated if the power block 18 is operating in the first mode. In this case, the first node A (also referred to as the current limiting node) is connected to the multi-function terminal (MF). Thus, the operational internal block diagram is that appearing in FIG. 7.

An external current limiting resistor 80 is connected at the MF terminal. The maximum current limit can be changed by changing or adjusting the value for external resistor 80. For purposes of illustration, resistors 54 and 56 may have values of 2.0 KΩ and 0.8 KΩ, respectively. This results in a resistance value of 2.8 KΩ at the non-inverting input terminal of the PWM comparator 42. A resistor having a value of X KΩ, and which is connected to the current limit node A through the MF terminal, seems to be in parallel with 2.8 KΩ resistance because the diodes 52 and 302 are biased by the internal current source 40 main (providing current of, for example, 900 μA). A typical IC device used in such application may have an Ids current of 2.15 A. If an Ids current peak value of 1 A is desired, then the following equation can be used to obtain a value for X:2.15:1=2.8KΩ:XKΩ, X=1.3KΩ.

Figure 8:
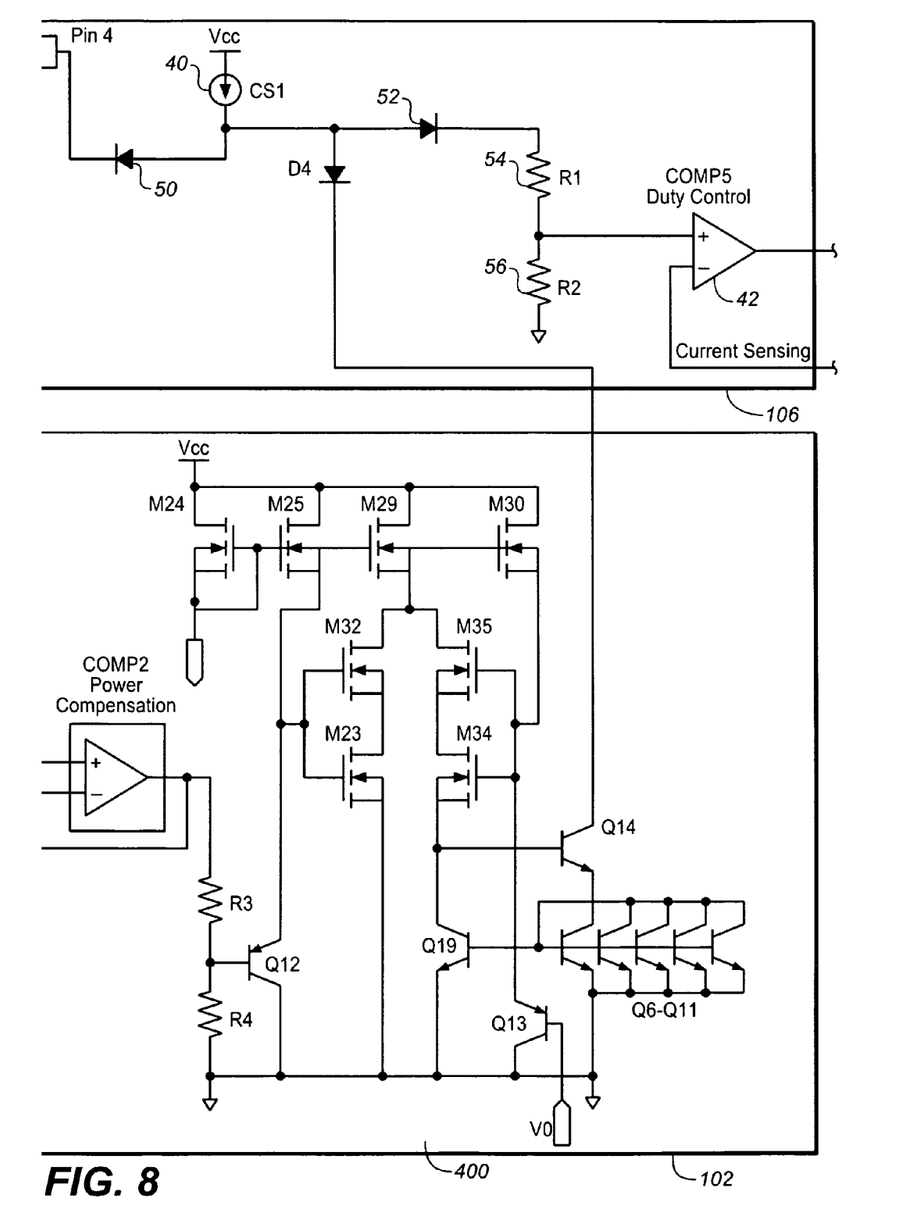
FIG. 8 is a schematic diagram of circuitry for performing a function of limiting power, according to an embodiment of present invention.

FIG. 8 is a schematic diagram of circuitry 102 for performing a function of limiting power, according to an embodiment of present invention. In one embodiment, circuitry 102 can be an implementation, at least in part, for second function circuitry.

The power block 18 may be provided with such functionality to limit the maximum duty cycle of a switching waveform generated by a control circuit 72 to control the DC output of the power supply system 10. This can reduce the saturation of the transformer 16 during power up and safely limit the excess power capability at high input voltages. Increased duty cycle at low DC input voltages also allows for smaller input filter capacitance. Thus, this function of limiting power allows a cost savings on many components in the power supply system 10, including the transformer 16.

Figure 10:
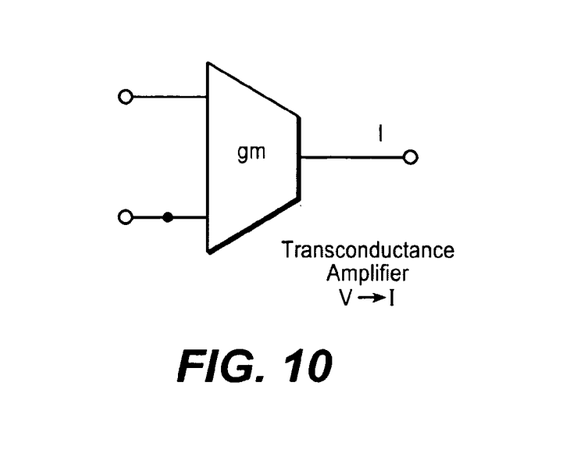
FIG. 10 depicts the operational concept of a transconductance amplifier.

As depicted, circuitry 102 includes a comparator COMP2 and a transconductance amplifier 400. The comparator COMP2 has a positive input terminal and a negative input terminal. The positive input terminal may be connected to the transistor M15 (see FIG. 6). The negative input terminal is connected to the output of comparator COMP2. The transconductance amplifier 400 may be connected to a diode D4 that is coupled to the internal current source CS1 40. The transconductance amplifier 400 may include the elements between the output of comparator COMP2 and diode D4. The operational concept of the transconductance amplifier (gm) is shown in FIG. 10.

Switches Q6 through Q11 may provide a constant current, which is independent of environmental conditions (e.g., temperature) or transistor characteristics.

Switches M24, M25, M29, M30 implement one or more current sources to operate transconductance amplifier 400. Other portions of transconductance amplifier 400 function to sink the current from switches M24, M25, M29, M30. The current flowing through switch M29, which may be constant, is equal to the sum of the currents flowing through switches M32 and M35. The voltage at the gates of switches M24 and M25 may follow the voltage at the output of comparator COMP2. The output from comparator COMP2 controls the amount of current sunk source through switch M32. As the voltage at the output of comparator COMP2 increases, the current sunk through switch M32 decreases. Because of the relationship between the currents flowing in switches M32 and M35, a decrease in current flowing through switch M32 cause an increase in the current flowing through switch M35. This causes the current flowing through the branch of the transconductance amplifier 400 connected to diode D4 to increase.

As such, with this arrangement of circuitry 102, the voltage at the negative input terminal of comparator COMP2 causes a change in the current flowing through the branch of the transconductance amplifier 400 connected to diode D4. In particular, the higher the voltage at the negative input terminal of comparator COMP2, the greater the current flowing through the branch of the transconductance amplifier 400 connected to diode D4. If more current flows through the branch of the transconductance amplifier 400 connected to diode D4, then less current flows from the internal current source CS1 40 through diode 52, thus limiting the maximum duty cycle of the switching power supply. Accordingly, the function of power limiting is provided.

Figure 9:
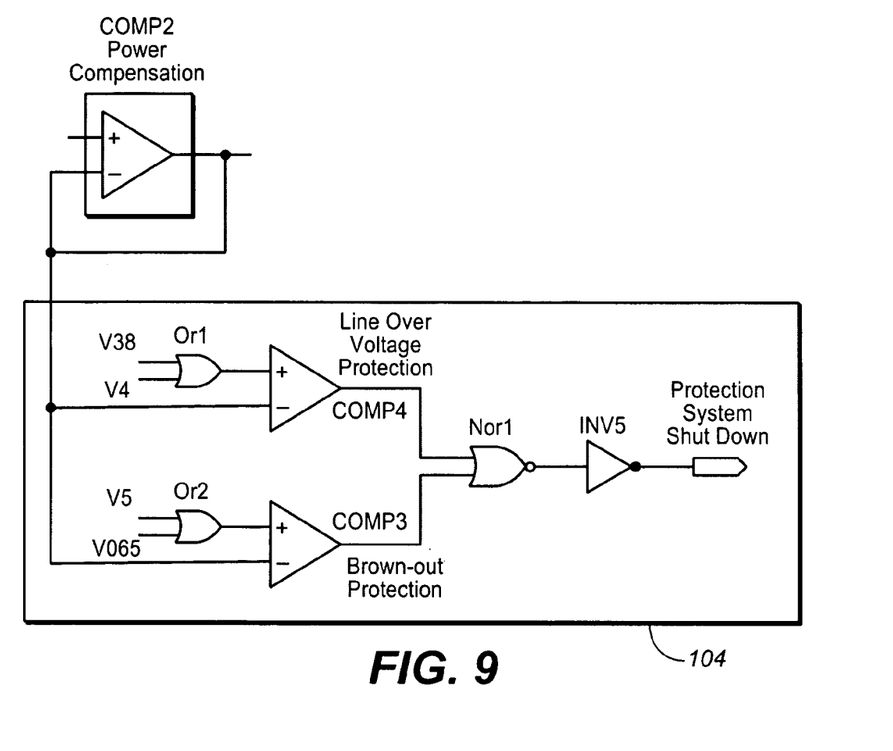
FIG. 9 is a schematic diagram of circuitry for performing a function of brown-out protection, according to an embodiment of present invention.

FIG. 9 is a schematic diagram of circuitry 104 for performing a function of brown-out protection, according to an embodiment of present invention. In one embodiment, circuitry 104 can be an implementation, at least in part, for second function circuitry.

The power block 18 may be provided with brown-out protection to detect an under-voltage condition in the input line (i.e., a "brown out") so that the power supply system 10 can be shut down without any glitches in the output. The over-voltage protection is provided to detect an over-voltage condition in the input line voltage of the power supply system 10 so that the power supply system 10 can be shut down under this abnormal condition. This allows the power supply system 10 to handle much higher surge voltages due to the absence of reflected voltage and switching transients on the switch 30 in the power block 18.

Circuitry 104 may generate an output signal which causes the power block 18, and thus power supply system 10, to shut down if there is either a brown-out condition or a line over-voltage condition.

Circuitry 104 may be connected to the comparator COMP2 of circuitry 102. The voltage at the positive input terminal of the comparator COMP2 may be the same as the voltage at the output terminal of the comparator COMP2 (because of a voltage follower arrangement). The voltage at the negative input terminal of the comparator COMP2 is the same as the voltage at the output terminal of the comparator COMP2 because the terminals are connected together. This allows circuitry 104 to detect line voltage.

Circuitry 104 includes a comparator COMP3 and a comparator COMP4. For brown-out protection, comparator COMP3 compares the voltage at the output of comparator COMP2 against a voltage of, for example, 0.65V (or V065). After brown-out protection is achieved, comparator COMP3 compares against a voltage of, for example, 0.5V (or V5, which is higher than V065) for system stability. For the line-over voltage protection, comparator COMP4 compares the voltage at the output of comparator COMP2 against a voltage of, for example, 4.0V (or V4). After line-over voltage protection is achieved, comparator COMP3 compares against a voltage of, for example, 0.38V (or V38, which is lower than voltage V4) for system stability.

Figure 11:
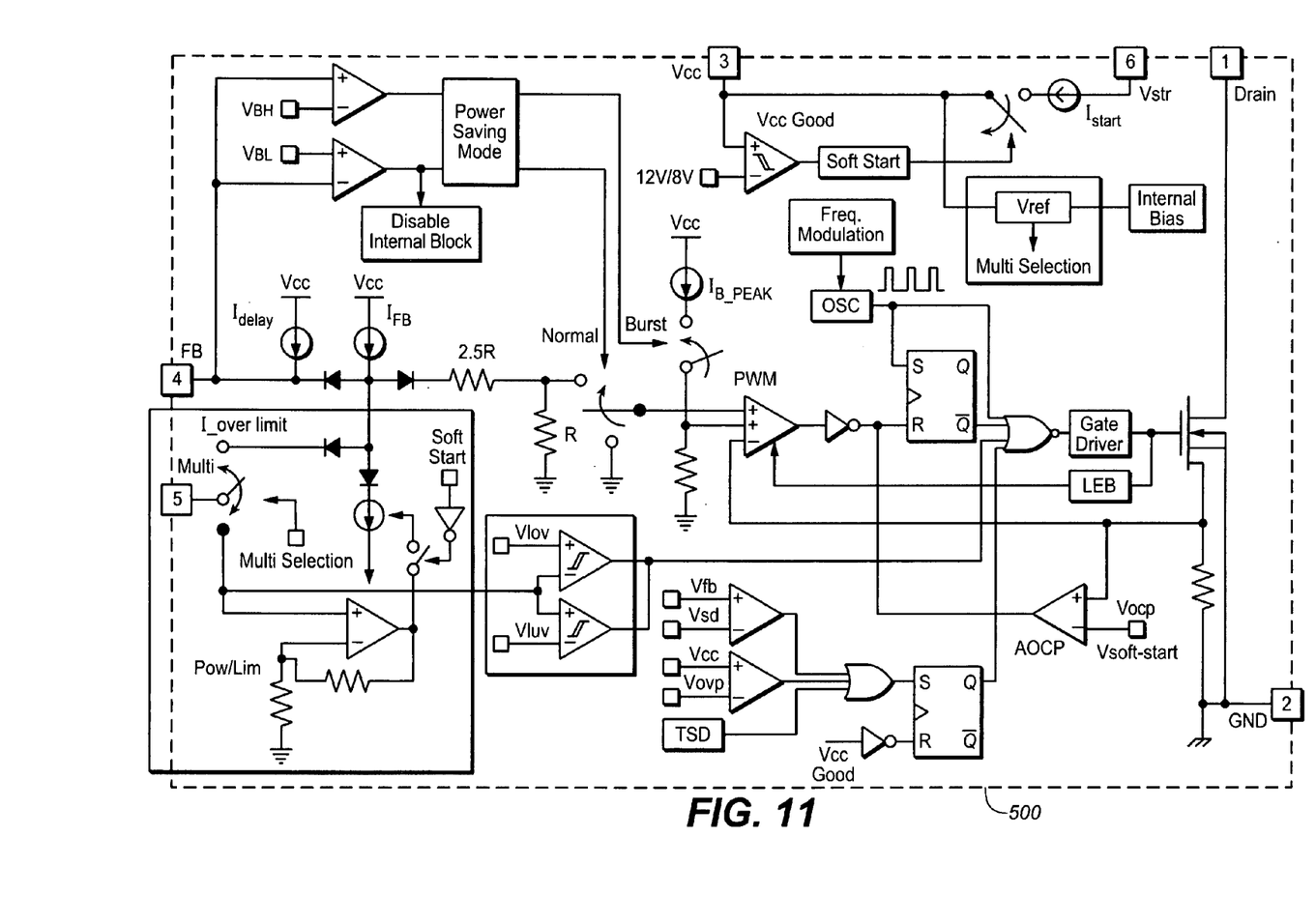
FIG. 11 is a schematic diagram in partial block form of an integrated circuit (IC) device implementing a power block having a multi-function terminal, according to an embodiment of present invention.

FIG. 11 is a schematic diagram in partial block form of an integrated circuit (IC) device 500 implementing a power block 18 having a multi-function terminal, according to an embodiment of present invention. The device 500 is capable of normal operation, as well as operating in a number of modes which provide respective functions.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

The invention claimed is:

1. An integrated circuit (IC) device comprising:
a first function circuitry operable to perform a first function, wherein the first function comprises at least one of a current limiting function, a power limiting function, over-voltage protection, and brown-out protection;

a second function circuitry operable to perform a second function, wherein the second function comprises at least another of the current limiting function, the power limiting function, over-voltage protection, and brown-out protection;

a multi-function terminal; and a voltage sensing circuit coupled to the multi-function terminal for sensing a voltage at the multi-function terminal, wherein:

if the sensed voltage is above a predetermined level, the first function circuitry is activated to perform the first function;

if the sensed voltage is below the predetermined level, the second function circuit is activated to perform the second function;

wherein the first function circuitry comprises:

a comparator having a first input terminal, a second input terminal, and an output terminal, wherein the first terminal is coupled to the multi-function terminal when the first function circuitry is activated, wherein the second input terminal is coupled to the output terminal; and a transconductance amplifier coupled to the comparator, the transconductance amplifier operable to conduct current in response to a voltage value at the output terminal of comparator, wherein the amount of current conducted by the transconductance amplifier controls a duty cycle for a switch of the IC device.

2. The IC device of claim 1 the switch of the IC device has a gate, a source, and a drain.

3. The IC device of claim 2 comprising a controller for controlling a duty cycle of the switch.

4. The IC device of claim 2 wherein the switch comprises a metal-oxide-semiconductor field-effect transistor.

5. The IC device of claim 1 comprising a feedback terminal operable to receive a feedback signal.

* * * * *